United States Patent [19]
Andrews

[11] 3,783,550
[45] Jan. 8, 1974

[54] NOVELTY ELECTRIC MOTOR

[76] Inventor: Roger Wayne Andrews, 4190 Oakman St., South, Salem, Oreg. 97302

[22] Filed: Apr. 21, 1972

[21] Appl. No.: 246,454

[52] U.S. Cl............................ 46/45, 46/234
[51] Int. Cl............................... A63h 33/26
[58] Field of Search................. 46/45, 234, 235

[56] References Cited
UNITED STATES PATENTS

| | | | |
|---|---|---|---|
| 312,178 | 2/1885 | Bacon | 46/234 |
| 1,226,835 | 5/1917 | Wilder | 46/45 |
| 1,966,686 | 7/1934 | Russ | 46/235 |
| 2,583,741 | 1/1952 | Kiler | 46/235 |
| 2,774,185 | 12/1956 | Kosch | 46/235 |
| 2,974,265 | 3/1961 | Thoma | 46/235 UX |

*Primary Examiner*—Antonio F. Guida
*Assistant Examiner*—Robert F. Cutting
*Attorney*—Oliver D. Olson

[57] ABSTRACT

A permanent magnet armature is arranged to be moved initially in spaced proximity to an induction coil connected in an electric circuit including a source of electric potential and an electronic switch such that when the moving magnetic field of the magnet cuts the coil turns the resulting induced current operates the switch momentarily to connect the source of electric potential across the coil. The resulting current flow through the coil produces a magnetic field which is imposed upon the moving magnet such as to accelerate its movement. The magnet may take many forms, such as a spinning top, a motor rotor, a pendulum or other reciprocating member, and others.

14 Claims, 11 Drawing Figures

PATENTED JAN 8 1974　　　　　　　　　　　　　　　　　3,783,550
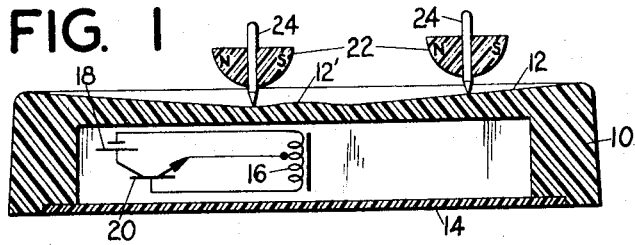
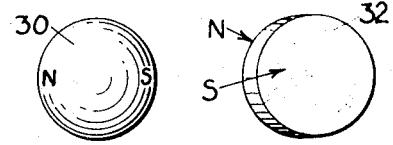
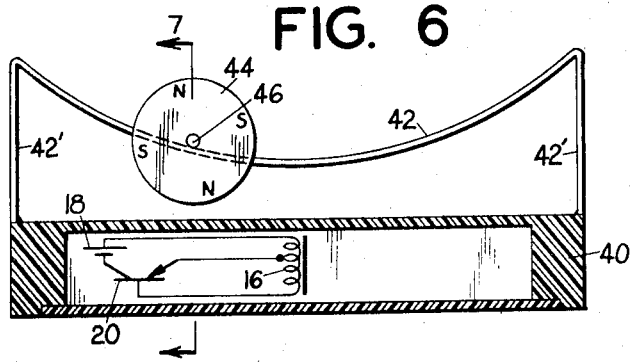
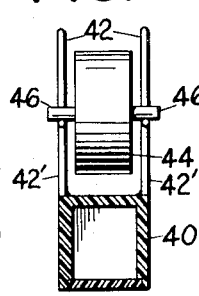
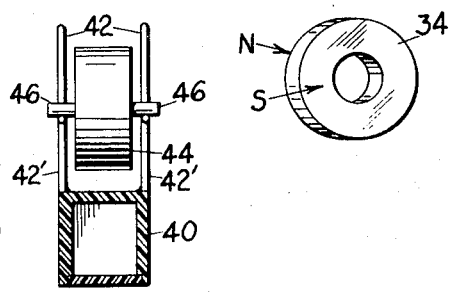
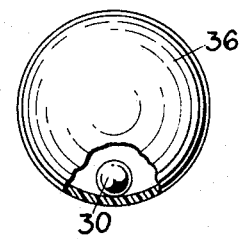
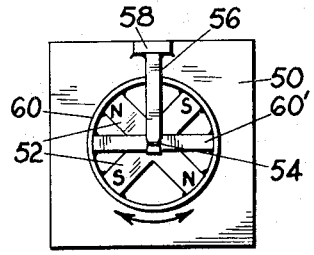
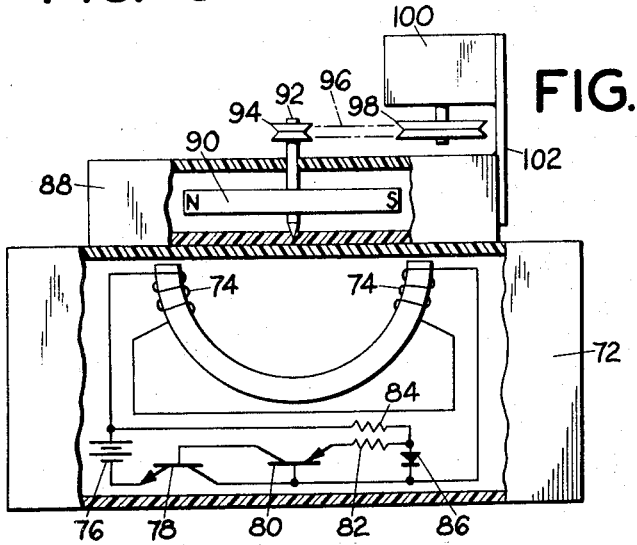
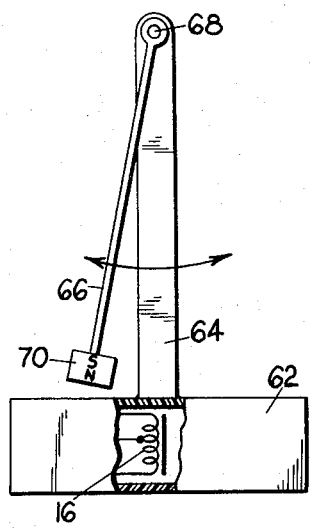

NOVELTY ELECTRIC MOTOR

BACKGROUND OF THE INVENTION

This invention relates to electric motors and more particularly to a novelty electric motor which appears to have no source of power.

Electric motors are generally characterized by a concentric arrangement of a rotor and a stator which are relatively fixed against axial and radial displacement while accommodating relative rotation. They are recognized for their effective utilitarian purposes, but are not looked upon as attractive and interesting devices.

Novelty electric motors have been provided heretofore in the form of the spinning tops which derive their power from and are controlled by a source of alternating current. The tops thus spin at a predetermined speed and on a fixed axis or other fixed path, in a rather uninteresting manner.

SUMMARY OF THE INVENTION

In its basic concept, the novelty electric motor of this invention involves a concealed stator ciruit which is controlled by a magnet armature which is movable freely and independently of the stator in diverse directions.

It is by virtue of the foregoing basic concept that the principal objective of this invention is achieved; namely, to provide a novelty electric motor having no apparent source of power and constructed in the form of an attractive and amusing toy, conversation piece, advertising display, object for scientific study and the like.

Another object of this invention is the provision of a novelty electric motor having a freely movable armature which performs amusing and interesting motions.

The foregoing and other objects and advantages of this invention will appear from the following detailed description taken in connection with the accompanying drawing of preferred embodiments.

BRIEF DESCRIPTION OF THE DRAWING

FIG. 1 is a view in cross section of a novelty electric motor embodying the features of this invention, the same being in the form of a spinning top.

FIGS. 2, 3, 4 and 5 are perspective views of alternative forms of spinning objects which may be utilized in the novelty electric motor of FIG. 1.

FIG. 6 is a view in cross section with a second form of novelty electric motor embodying the features of this invention.

FIG. 7 is a sectional view taken on the line 7—7 in FIG. 6.

FIG. 8 is a front elevation of a third form of novelty electric motor embodying the features of this invention, parts thereof being broken away to disclose details of construction.

FIG. 9 is a plan view of the novelty electric motor shown in FIG. 8.

FIG. 10 is a front elevation of a fourth form of novelty electric motor embodying the features of this invention.

FIG. 11 is a view in elevation of a fifth form of novelty electric motor embodying the features of this invention, parts being broken away to disclose details of construction.

DESCRIPTION OF THE PREFERRED EMBODIMENTS

In general, the novelty electric motor of this invention includes an inductance coil stator and a magnet armature spaced from and movable independently of and in diverse directions relative to the stator. The stator coil is connected to a source of electric potential by which to produce a magnetic field for inducing rotation of the magnet armature. The electric circuit of the coil includes means controlled by movement of the magnet armature for alternately opening and closing the circuit.

Referring first to the embodiment illustrated in FIG. 1, the novelty electric motor is in the form of an amusing and interesting spinning top toy or conversation piece. Thus, it includes a housing of non-magnetic material, such as wood or synthetic thermoplastic or thermosetting resin. The housing is hollow and includes a peripheral wall 10 and a dished top base 12 the outer surface of which preferably is concave inwardly toward a slightly convex central portion 12'. The bottom, open side of the housing is removably closed by a bottom wall 14.

Within the hollow housing there is mounted an induction coil 16, preferably of the iron core, electromagnet type. The opposite ends of the coil are connected across a source of direct current electric potential, for example one or more conventional dry cells 18, through a control switch. In the embodiment illustrated the control switch comprises a transistor 20 of the NPN type. The base of the transistor is connected to one end of the coil, the collector is connected to the positive terminal of the battery and the negative terminal of the battery is connected to the opposite end of the coil. The emitter is connected to an intermediate winding of the coil.

The armature of the motor illustrated in FIG. 1 is in the form of a spinning top. As illustrated, the top has a hemispherical body 22 and a pivot shaft 24 projecting through the rotational axis thereof. The body contains one or more magnets with the poles thereof disposed in a plane extending perpendicular to the rotational axis.

The operation of the novelty electric motor illustraated in FIG. 1 is as follows: The portion of the pivot shaft 24 extending upwardly from the body 22 of the spinning top is grasped between the thumb and index finger and, while being held over the dished top base 12, is spun from the fingers onto said base. By virtue of the concave contour of the base, the spinning top gravitates toward the central convex portion 12'. The moving magnetic lines of force provided by the spinning magnet top cuts the turns of the coil and thus induces a current in the coil. As is well known, the flow of current through the coil is reversed when the turns are cut by the lines of force associated with the opposite poles of the magnet. Thus, in one direction of current flow through the base-emitter of the transistor switch, the transistor is turned on momentarily to connect the battery 18 across the coil 16. A pulse of battery current thus is applied momentarily through the coil, whereupon the latter produces a magnetic field which is imposed upon the spinning magnet top in such manner as to accelerate the spin of the top.

The magnetic field produced by the coil also influences other random motions of the spinning top, depending upon the location of the spinning top relative to the coil and to the positions of the magnet poles. Thus, the top may be flung outward of the central portion of the dished base to varying distances and at varying speeds and angles, or it may be pulled toward the center of the dished base. The spinning top also may be tilted slightly from vertical to varying degrees. The result of these variables is an amusing and interesting random skittering of the spinning top over the area of the base 12. The dished contour of the base functions to limit the extent of outward thrusting of the spinning top and thus effectively confines the spinning top within the confines of the base.

Accordingly, once the spinning top is put in motion upon the base, it continues to rotate and move about the base in random fashion for as long as the battery supply lasts. In this regard it has been found that with two pen light batteries connected in series, the magnet top will continue spinning for several days.

It will be understood that acceleration of the spinning top continues until a state of equilibrium is reached at which frictional losses equal the energy input. Such losses are due in part air friction, in part to the area of contact between the top and base, and in part to the extent to which the top is flung outward of the central portion of the base to areas of diminished influence.

Each time the rotating magnetic field of the appropriate pole of the magnet cuts the coil turns, the spinning magnet top is accelerated. At all other times, as when the magnetic field of the opposite pole cuts the coil turns, the transistor remains cut off and no current flows in the electric circuit. When the spinning top is removed from the base, the battery supply is effectively open circuited and therefore is not wasted.

The novelty electric motor described hereinbefore in connection with FIG. 1., thus may be utilized as an amusing and interesting toy or conversation piece since it gives the appearance of a continuously spinning top with no apparent source of power.

Additional amusement may be achieved by putting two or more tops in spinning motion on the dished base, as illustrated in FIG. 1. As the tops skitter about randomly over the base, they bump into each other on random occasions and under conditions such that one of the tops may be toppled over, or may even be ejected from the base. Thus, this mode of operation provides the basis for an amusing game of chance.

The spinning magnet top may take various forms other than the form illustrated in FIG. 1. Thus, it may take the form of a magnet ball 30 (FIG. 2); a flat disc 32 (FIG. 3); an annular disc 34 (FIG. 4). An interesting arrangement is illustrated in FIG. 5, wherein the magnet ball 30 of FIG. 2 is confined within a hollow ball 36 of non-magnetic material. As the magnet ball 30 is caused to rotate on the base 12, under the influence of the coil 16, its frictional engagement with the confining ball 36 causes the latter to rotate also, but at a slower speed. Occasionally, the magnet ball 30 is thrust about within the confining ball 36, thereby adding to the amusement.

Referring now to the embodiment illustrated in FIGS. 6 and 7, the novelty electric motor includes a hollow housing 40 which, as in FIG. 1, contains an induction coil 16 and a control circuit therefor. In this embodiment, however, the transistor 20 is of the PNP type and the polarity of the battery is appropriately reversed. Mounted upon the housing and extending upwardly therefrom are a pair of laterally spaced cradle members which provide a pair of laterally spaced, outwardly concave support surfaces. In the embodiment illustrated, these cradle members are formed of a pair of non-magnetic wires having upstanding end portions 42' anchored in the housing and interconnected by an intermediate arcuate portion 42. A disc-shaped magnet armature 44, arranged to be interposed between the pair of cradle members, is provided with oppositely extending axles 46 arranged for rolling support on the cradle members. The magnet disc may include one or more magnets arranged to provide alternate magnetic poles about the periphery of the disc. In the embodiment illustrated there are four such alternate poles.

In operation, the disc 44 is placed between the arcuate cradle members 42 to one side of the lowest portion thereof under which the induction coil 16 is located, and then released. The disc thereupon rolls along the cradle members on its axles 46 and in doing so traverses the coil. The moving magentic field thus provided by the rolling magnet armature induces current in the coil and consequent production of an accelerating magnetic field by the coil which functions to accelerate the movement of the disc.

The disc ultimately comes to rest at some point along the inclines of the cradle members and then begins rolling movement in the opposite direction. As it traverses the induction coil, it once again initiates operation of the switch 20 and the consequent pulsing of the coil and production of a magnetic field therefrom to accelerate the movement of the disc in said opposite direction.

The foregoing oscillatory motion of the disc may continue, if desired, until the battery supply is exhausted.

In the embodiment illustrated in FIGS. 8 and 9, the housing 50 contains the induction coil stator 16 and associated circuitry as previously described. The movable magnet armature 52 is illustrated in the form of a cross member providing a plurality of alternate magnetic poles, in the manner of the disc 44 previously described. The armature is disposed horizontally a spaced distance above the housing, and is supported by at least one, but preferably by a pair of elongated strings 54 or other flexible members which depend downwardly in laterally spaced relation from an arm 56 mounted at the top end of a post 58 secured to and extending upwardly from a housing. The magnet armature may serve as a support for advertising material and the like. For example, it may support an upstanding hollow cylinder 60 upon which advertising material may be printed or otherwise supported. For example, the cylinder may be painted or otherwise provided with spiral alternate colorings of a barber pole.

In the embodiment illustrated, the lower ends of the strings are secured to a cross piece 60' at the top end of the cylinder 60, in order to keep the center of mass below the strings. If the armature 52 is much heavier than the cylinder 60, or does not support a cylinder or other object, the strings may be attached directly to the armature. In any event the armature is supported by the depending string or strings.

In operation, with the magnet armature 52 initially in the position illustrated in FIG. 8, rotation of the armature is started by hand. Continued and accelerated rotation in the initiated direction is effected by operation of the induction coil circuit, as previously explained. As the armature continues its rotation, the spaced strings 54 are caused to wind about each other and thus become shortened. As a consequence, the rotating armature is elevated progressively from the housing, until it reaches an elevation at which the influence of the magnetic field of the induction coil is insufficient to further rotate the armature. Thereupon, the force of gravity acting upon the armature initiates unwinding of the twisted strings, with simultaneous rotation of the armature in the opposite direction from which it was initially rotated. As the strings unwind, the armature lowers progressively toward the housing and once again initiates the intermittent operation of the coil circuit to effect acceleration of rotation of the armature. When the rotating armature reaches the lowermost position illustrated in FIG. 8, it continues further rotation to once again cause twisting of the strings, but in the opposite direction.

The foregoing operation may be continued as long as the battery supply lasts, producing simultaneous axial rotation and vertical reciprocation of the armature.

In FIG. 10 the novelty electric motor is in the form of a pendulum. The hollow 62 housing contains the induction coil 16 and associated elecric circuit, as in the previous embodiments, and an upstanding post 64 on the housing mounts a pendulum arm 66 at its upper end, as by means of a pivot shaft 68. The arm may be a rigid rod, as illustrated, or it may be a flexible string or other form of line. The lower end of the arm supports a magnet armature 70, as indicated.

Oscillating of the pendulum is initiated by moving the arm 66 and supported armature 70 to a position offset angularly from vertical, as illustrated, and then releasing the arm for swinging motion. Oscillation of the pendulum is maintained in the manner described in connection with the previous embodiments, and may continue until the battery supply is exhausted.

When the arm 66 is rigid, the oscillation of the shaft 68 may function to drive an external device, as by connection through a ratchet mechanism.

FIG. 11 illustrates still another form of novelty electric motor. In this embodiment the hollow housing 72 contains within it an induction coil in the form of an electromagnet of the horseshoe type. One end of the coil winding 74 is connected to the positive terminal of a battery source 76 of direct current potential. The negative terminal of the battery supply is connected to the emitter of an NPN transistor 78, the collector of which is connected to the opposite end terminal of the coil winding. The base of the transistor 78 is connected to the collector of a PNP transistor 80 the base of which also is connected to said other end terminal of the coil winding. The emitter of the transistor 80 is connected through resistors 82 and 84 to the end of the coil winding connected to the positive terminal of the battery supply. A diode 86 is connected between the resistors and the base of the transistor for selectively shorting the base-emitter circuit thereof.

Supported freely upon the stator housing 72 is a hollow armature housing 88. A rotary magent armature 90 within the housing is secured to a rotary shaft 92 which extends upwardly through the housing and mounts a pulley 94. A belt 96 connects the pulley to a pulley 98 on the input shaft of a device 100 to be driven. Said device is mounted on the armature housing as by means of the bracket 102.

It is to be noted that the armature housing 88 is completely separate from the stator housing 72 and thus may be removed therefrom as a completely independent component. However, the armature housing may be secured to the stator housing, in which case the device 100 to be driven may be mounted in a fixed position independently of either or both housings.

In the operation of the motor of FIG. 11, rotation of the armature 90 is initaited by hand. As the rotating magnetic field of the armature cuts the turns of the coil 74, the resulting induced current activates the PNP transistor 80 which, in turn, activates the NPN transistor 78, whereby momentarily to connect the battery supply 76 across the coil. The pulse of current through the coil thus produces a magnetic field which is imposed upon the rotating magnet armature 90 in such manner as to accelerate the latter.

Although the motor illustrated in FIG. 11 may have more general utility than those of the previously described embodiments, which are primarily interesting and amusing toys and conversation pieces, it nevertheless is more interesting than a conventional electric motor by virtue of the removability of the armature component and the appearance that the output shaft 92 rotates without a source of power.

It is to be noted in the electric circuits illustrated that not only do the transistors function as switches by which to connect the battery supply across the coil, but in addition the circuits in which they are associated form oscillators which provide amplification and regenerative feedback during the portion of each cycle of movement of a magnet armature that causes activation of the transistor. Thus, the number of oscillations that occur during said portion of each cycle depends upon the speed of rotation (FIGS. 1, 8 and 11) or reciprocation (FIGS. 6 and 10) of the magnet armature. Interesting and amusing effects of this are obtained, for example, by connecting the audio amplifier of a speaker across the coil.

The single transistor circuits illustrated in FIGS. 1–10 are preferred for their simplicity and economy. However, the two transistor circuit illustrated in FIG. 11 offers the advantage, for certain applications, of enabling the driving of power transistors.

It will be apparent to those skilled in the art that various changes may be made in the size, shape, number, type and arrangement of parts described hereinbefore without departing from the spirit of this invention.

Having now described my invention and the manner in which it may be used, I claim:

1. A novelty electric motor comprising
 a. a stator coil having a stationary magnetic metal core and an electric circuit,
 b. a magnet armature,
 c. means supporting the magnet armature in spaced proximity to and externally of the coil for movement relative to and externally of the coil,
 d. a source of electric potential in the electric circuit of the coil, and
 e. means in said electric circuit operable by coil current induced by movement of the magnet armature for releasably connecting the source of electric potential across the coil momentarily to impose a magnetic field on the magnet armature to accelerate the movement thereof.

2. The novelty electric motor of claim 1 wherein the connecting means comprises an electric switch in the electric circuit of the coil and responsive to current induced in the coil by movement of the magnet armature to connect the source of electric potential across the coil.

3. The novelty electric motor of claim 1 wherein the connecting means comprises a transistor the base-emitter circuit of which is connected across a portion of the coil and the emitter-collector circuit of which is connected across the remaining portion of the coil through the source of electric potential.

4. The novelty electric motor of claim 3 wherein the base-collector circuit includes a second transistor the base of which is connected to the collector of the first transistor and the emitter-collector circuit of which is connected across the coil through the source of electric potential.

5. The novelty electric motor of claim 1 wherein the magnet armature is a magnet member capable of being rotated about an axis, and the supporting means therefor comprises a non-magnetic base above the coil arranged to support the magnet member freely thereon for rotation in spaced proximity to the coil.

6. The novelty electric motor of claim 5 wherein the magnet member is a spinning top.

7. The novelty electric motor of claim 5 wherein the magnet member is a ball.

8. The novelty electric motor of claim 5 wherein the magnet member is a ball confined within a hollow non-magnetic ball.

9. The novelty electric motor of claim 5 wherein the magnet member is a disc.

10. The novelty electric motor of claim 5 wherein the magnet member is an annular disc.

11. The novelty electric motor of claim 1 wherein the magnet armature is a magnet member capable of being rotated about its axis, and the supporting member therefor comprises at least one flexible line mounted above and depending downward toward the coil and supporting the magnet member at the lower end thereof.

12. The novelty electric motor of claim 1 wherein the magnet armature is a magnet member capable of being rotated about an axis, and the supporting means therefor comprises a base mounted removably adjacent the coil, a shaft mounting the magnet member and supported by the base for rotation with the magnet member on a fixed axis, and means interconnecting the shaft and a device to be rotated thereby.

13. The novelty electric motor of claim 1 wherein the magnet armature is a magnet member capable of being rotated about an axis, and the supporting means therefor comprises a pair of spaced cradle members supporting the magnet member between them for rolling movement on said axis above and reciprocatively relative to the coil.

14. The novelty electric motor of claim 1 wherein the magnet armature is a magnet member, and the supporting means therefor comprises a pendulum arm supported at its upper end for swinging movement and supporting the magnet member at its lower end for reciprocative movement relative to the coil.

* * * * *